Nov. 20, 1956          H. SELLO          2,771,488
RECOVERING TERTIARY-ALKYL SUBSTITUTED BENZOIC ACID
Filed July 20, 1953
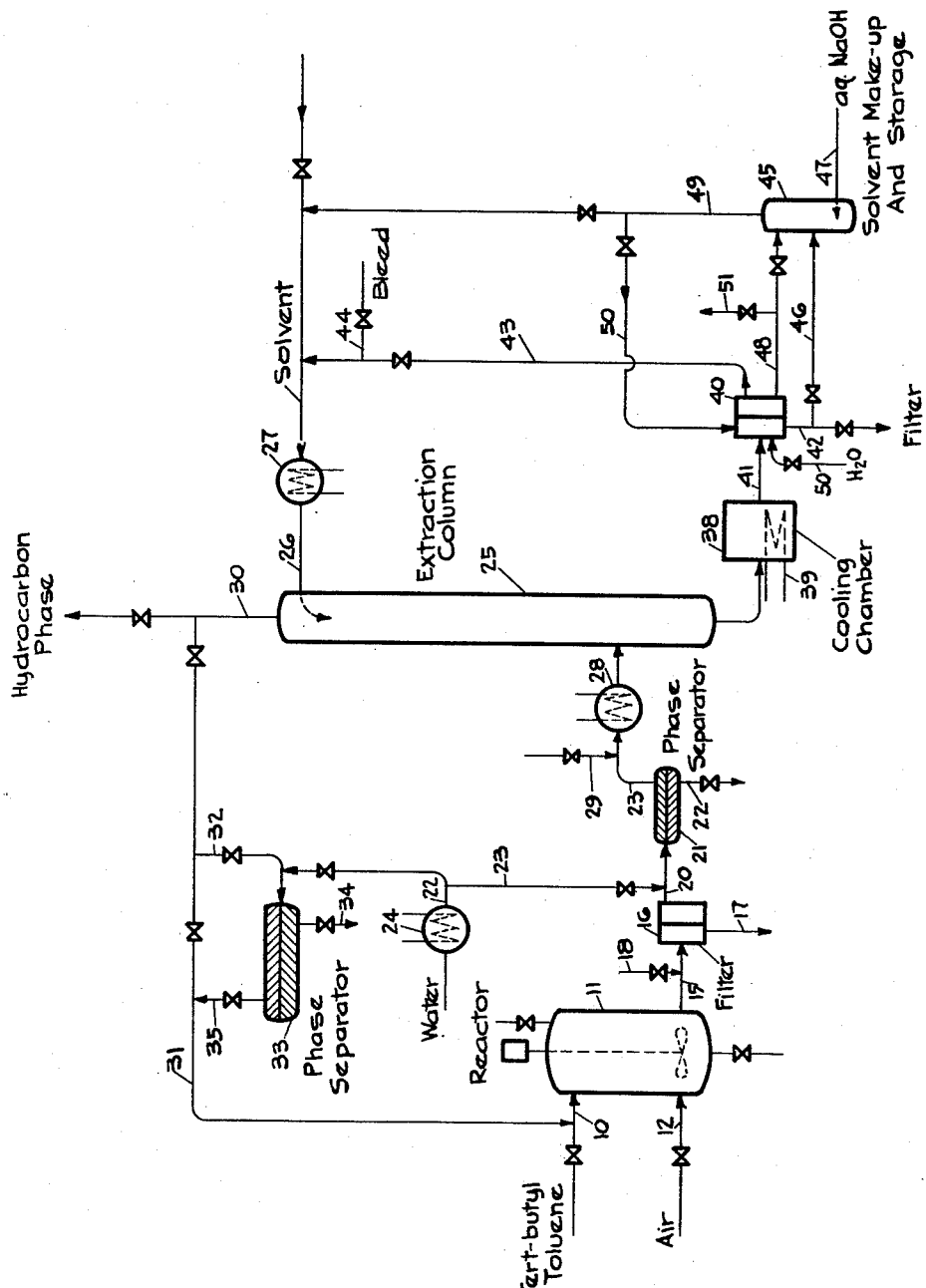
Inventor: Harry Sello
By E. Netter Mark
His Agent

United States Patent Office 2,771,488
Patented Nov. 20, 1956

2,771,488

RECOVERING TERTIARY-ALKYL SUBSTITUTED BENZOIC ACID

Harry Sello, Berkeley, Calif., assignor to Shell Development Company, Emeryville, Calif., a corporation of Delaware Application July 20, 1953, Serial No. 369,029

8 Claims. (Cl. 260—525)

This invention relates to the separation of organic acids having relatively low solubility in aqueous solvents from mixtures comprising them in admixture with hydrocarbons and organic compounds possessing appreciable solubility in aqueous solvents. An aspect of this invention relates to the production of aromatic carboxylic acids. The invention relates more particularly to the separation of aromatic carboxylic acids in a high state of purity from crude reaction products obtained by oxidizing aromatic hydrocarbons. A particular aspect of the invention relates to an improved process for treating crude oxidation products obtained by oxidizing tertiary-alkyl substituted benzene hydrocarbon to effect the more efficient recovery therefrom of tertiary-alkyl-substituted benzene carboxylic acids in a high state of purity.

The aromatic carboxylic acids, comprising the tertiary-alkyl-substituted benzene carboxylic acids, such as, for example, para-tertiary-butyl benzoic acid have become of increased importance in many fields of application. They are employed, for example, as intermediate and starting materials in the production of valuable chemical derivatives therefrom. A particularly important field of their application is as components in ingredients used in the manufacture of improved plastic and resinous materials comprising surface coatings. Suitability of these acids, and particularly the tertiary-alkyl-substituted carboxylic acids, for use in many of these fields of application is dependent upon the absence therein of any substantial amount of impurities. Processes directed to the manufacture of these aromatic acids, such as those employing aromatic hydrocarbon oxidation, generally produce them as components of highly complex mixtures from which they have heretofore been separated in a sufficiently high state of purity only with great difficulty by resort to complex and costly procedures. Impurities with which these tertiary-alkyl-substituted benzene carboxylic acids are generally unavoidably admixed in the crude products obtained in such processes include a complex mixture of oxygen-containing compounds and comprise certain amounts of color-forming impurities. The color-forming impurities comprise materials extremely potent in their effect upon discoloration of the tertiary-alkyl-substituted benzene carboxylic acids. Their presence in even exceedingly small amounts will therefore generally render the acid containing them unsuited for use in many of the more valuable fields of application. Their adverse effect upon color of the product is often latent and becomes particularly pronounced when materials prepared from ingredients comprising them, such as resinous surface coatings, are subjected to elevated temperatures. The complexity of the composition of the crude acid-containing hydrocarbon oxidation products and the presence of certain of the color-imparting impurities in exceedingly small amounts, has rendered exceedingly difficult their separation and identification with finality. To assure their absence in the purified product, methods of purification heretofore resorted to often included of necessity a multiplicity of operative steps, as well as a discarding of a substantial portion of the valuable tertiary-alkyl-substituted benzene carboxylic acid.

A further disadvantage of processes available heretofore is their dependence upon substantial amounts of reagents such as alkalis, mineral acids, and the like, from an outside source. The use of mineral acids presents problems of equipment corrosion, by-product disposal, and the need for costly corrosion resisting materials of construction. The resulting high cost of the operation and the low yields obtained, often rendered such processes commercially unfeasible and prevented full realization of the potential value inherent in the use of the tertiary-alkyl-substituted benzene carboxylic acids in many fields of application.

Improved methods have been found such as, for example, that disclosed and claimed in co-pending application Serial No. 369,226, filed July 20, 1953, enabling recovery of the desired aromatic acids in a state of relatively high purity. However, such processes still are based upon a sequence of steps comprising salt formation and acid springing, wherein purity of product and yield are achieved only by careful control of operating conditions such as hydrogen ion concentration, temperature, etc., within a relatively inflexible, narrow range.

It is an object of the present invention to provide an improved process enabling the more efficient recovery of organic acids proposing relatively low solubility in aqueous solvents from mixtures comprising them in admixture with hydrocarbons and organic oxygen-containing compounds having appreciable solubility in aqueous solvents in the absence of any substantial amounts of corrosive materials such as mineral acids.

Another object of the invention is the provision of an improved process enabling the more efficient recovery, in continuous operation and with a minimum of operative steps of aromatic carboxylic acids in a high state of purity from hydrocarbon oxidation products comprising them.

Another object of the invention is the provision of an improved process enabling the more efficient recovery of high purity aromatic carboxylic acids from hydrocarbon oxidation products comprising them in continuous operation with a minimum of operative steps permitting of an unusual degree of flexibility in operating variables.

Still another object of the present invention is the provision of an improved process enabling the more efficient purification of crude oxidation products containing alkyl-substituted benzene carboxylic acids having at least one tertiary-alkyl group substituted on the benzene ring obtained by oxidizing alkyl-substituted benzene hydrocarbons having at least one tertiary-alkyl group substituted on the benzene ring.

A further object of the invention is the provision of an improved process for the purification of crude oxidation products obtained by oxidizing tertiary-alkyl-substituted benzene hydrocarbons enabling the more efficient recovery of tertiary-alkyl-substituted benzene carboxylic acids in a high state of purity therefrom with high yields and a minimum of operative steps.

A still further object of the invention is the provision of an improved process for the treatment of products of oxidation obtained by oxidizing tertiary-alkyl-substituted benzene hydrocarbons enabling the more efficient recovery of tertiary-alkyl-substituted benzene carboxylic acids free of any substantial amount of color-imparting impurities therefrom.

A particular object of the invention is the provision of an improved process enabling the more efficient recovery of tertiary-alkyl-substituted benzoic acids free of color-imparting impurities from crude oxidation products comprising them obtained by oxidizing corresponding aromatic hydrocarbons.

A specific object of the invention is the provision of an improved process enabling the more efficient recovery of para-tertiary-butyl benzoic acid in a high state of purity free from any substantial amount of color imparting impurities from the crude para-tertiary-butyl benzoic acid-containing oxidation products obtained by oxidizing aromatic hydrocarbons comprising tertiary-butyl toluene. Other objects and advantages of the invention will become apparent from the following detailed description thereof made with references to the attached drawing wherein the single figure represents more or less diagrammatically one form of apparatus suitable for carrying out the process of the invention.

In accordance with the present invention organic acids having no appreciable solubility in aqueous solvents are recovered from mixtures containing them in admixture with hydrocarbons and oxygen-containing organic compounds possessing appreciable solubility in aqueous solvents by extracting said mixtures in the liquid phase with a solvent consisting essentially of a solution of the water-soluble salt of an alkali metal with an organic carboxylic acid which organic carboxylic acid possesses no appreciable solubility in aqueous solvents, and separating the desired organic acid from the resulting extract phase. In accordance with a more specific aspect of the invention aromatic carboxylic acids such as, for example, alkyl-substituted benzene carboxylic acids, are obtained in a high state of purity from crude aromatic acid-containing mixtures such as, for example, crude hydrocarbon oxidation products comprising them, by extracting said mixtures in the liquid phase with an aqueous solution of a salt of an aromatic carboxylic acid, for example, an alkali metal salt of the aromatic carboxylic acid being recovered, as the solvent and separating aromatic carboxylic acid from the resulting extract phase.

The process of the invention is applied broadly to the separation of organic acids having relatively low solubility in aqueous solvents from mixtures comprising them in admixture with hydrocarbons and oxygen-containing organic compounds possessing appreciable solubility in aqueous solvents. It is applied with advantage to the treatment of crude aromatic carboxylic acids obtained from any suitable source. The invention is applied, for example, to the separation of aromatic acids in a high state of purity from crude mixtures obtained by the catalytic oxidation of aromatic hydrocarbons having an alkyl substituted aromatic nucleus under conditions resulting in the oxidation of an alkyl substituent attached to the aromatic nucleus. Aromatic hydrocarbons of this class are exemplified, for example, by the alkyl-substituted benzenes and alkyl-substituted naphthalenes such as toluene, the xylenes, ethyl benzene, propylbenzene, isopropylbenzene (cumene), tetramethylbenzene, paracymene, 1-methyl-4-tertiarybutyl benzene, 1-methyl-4-tert.-amyl benzene, methyl-dodecyl benzene, 1- and 2-methyl naphthalenes, alpha, beta-dimethyl naphthalene, and their homologues.

In the presence of suitable oxidation catalysts these alkyl substituted aromatic hydrocarbons are converted to aromatic acids corresponding to the aromatic hydrocarbons having a carboxyl group in the alkyl side chain. Such aromatic acids are exemplified by, benzoic acid; the alkyl substituted benzoic acids such as tertiary butyl benzoic acid, amyl benzoic acid, tert.-amyl benzoic acid, cumic acid, dodecyl benzoic acid, para-tertiary-nonyl-benzoic acid, para-tert.-dodecylbenzoic acids, methyl-dodecylbenzoic acids, para-tert.-hexylbenzoic acids, alpha- and beta-naphthoic acids, and alpha, beta-dinaphthoic acids, and the like.

Suitable oxidation catalysts employed in the oxidation of the alkyl aromatic acids comprise, for example, oxides, hydroxides and organic salts of the so-called heavy metals, particularly such metals as cobalt, manganese, lead, iron, nickel, copper, vanadium, chromium, mercury, and combinations thereof. Included in suitable oxidation catalysts are organic salts of the metals of the first transition series of the elements, that is, those having an atomic number of from 22 to 30, and mixtures thereof. Examples of oxidation catalysts consisting essentially of a salt of metal and an organic acid include, cobalt naphthenate, cobalt isovaleryl acetonate, chromium acetylacetonate, cobalt butenylacetonate, cobalt para-toluate, cobalt actoate, cobalt acetate, chromium naphthenate, nickel naphthenate, nickel acetylacetonate, lead acetate, manganese naphthenate, and the like. The specific oxidation catalyst employed will often vary in accordance with the specific material to be oxidized and the operating conditions employed.

Comprised in the crude aromatic carboxylic acids purified in accordance with the invention are the crude oxidation products, containing alkyl-substituted benzene carboxylic acids having at least one tertiary-alkyl radical linked directly to the benzene nucleus, obtained by the oxidation of hydrocarbons comprising alkyl-substituted benzenes having at least one tertiary-alkyl radical and at least one non-tertiary alkyl radical directly linked to the benzene ring under conditions resulting in the oxidation of a substituent alkyl group.

As employed throughout the specification and appended claims, the terms "primary-alkyl radical," "secondary-alkyl radical," and "tertiary-alkyl radical" designate the monovalent hydrocarbon radicals having the formulas —$CH_2R$, —$CHR'_2$, and —$CR'_3$, respectively, in which R is the hydrogen atom or an alkyl radical, and R' is an alkyl radical; the hydrocarbon radical being attached to the benzene ring by the free valency in the formula in each case. The term "non-tertiary-alkyl radical" refers exclusively to the primary-alkyl and the secondary-alkyl radicals. The tertiary-alkyl radical may contain, for example, from four to twenty-one carbon atoms. The process is applied with particular advantage to the purification of crude aromatic hydrocarbons having not more than one tertiary-alkyl radical substituted on the benzene ring and wherein the non-tertiary-alkyl radical, or radicals, substituted on the benzene ring preferably contain from one to four carbon atoms. Illustrative examples of individual aromatic hydrocarbons of the above defined class which upon selective oxidation result in crude oxidation products comprising alkyl-substituted benzene carboxylic acids treated in accordance with the present invention include, among others, para-tertiary-butyl toluene, ortho-tertiary-butyl toluene, meta-tertiary-butyl toluene, para-tertiary-amyl toluene, ortho-tertiary-amyl toluene, meta-tertiary-amyl toluene, para-tertiary-hexyl toluene, meta-tertiary-hexyl toluene, ortho-tertiary-hexyltoluene, para-tertiary-heptyl toluene, ortho-tertiary-heptyl toluene, meta-tertiary-heptyl toluene, para-tertiary-nonyl toluene, ortho-tertiary-nonyl toluene, meta-tertiary-nonyl toluene, para-tertiary-dodecyl toluene, ortho-tertiary-dodecyl toluene, meta-tertiary-dodecyl toluene, para-tertiary-tetradecyl toluene, ortho-tertiary-tetradecyl toluene, meta-tertiary-tetradecyl toluene, para-tertiary-pentadecyl toluene, ortho-tertiary-pentadecyl toluene, meta-tertiary-pentadecyl toluene, para-tertiary-hexadecyl toluene, ortho-tertiary-hexadecyl toluene, meta tertiary-hexadecyl toluene, para-tertiary-octadecyl toluene, ortho-tertiary-octadecyl toluene, meta-tertiary-octadecyl toluene, para-tertiary-eicosyl toluene, ortho-tertiary-eicosyl toluene, meta-tertiary-eicosyl toluene, para-tertiary-heneicosyl toluene, ortho-tertiary-heneicosyl toluene, meta-tertiary-heneicosyl toluene, 3,5-di-tertiary-butyl toluene, etc. While the tertiary-alkyl-substituted toluenes form a preferred group of suitable hydrocarbons, there can also be employed aromatic hydrocarbons having substituted on the benzene ring a tertiary-alkyl group and in addition thereto, a plurality of methyl groups and/or one or more lower alkyl groups other than the methyl group. Such aromatic hydrocarbons are illustrated by the tertiary-butyl xylenes, the tertiary-heptyl xylenes, the tertiary-dodecyl xylenes, ortho-tertiary-hexyl ethyl benzene, meta-tertiary-hexyl ethyl benzene, para-tertiary-hexyl ethyl benzene, para-tertiary-amyl propyl benzene, para-tertiary nonyl n-butyl benzene, 2-propyl-4-tertiary-butyl ethyl benzene, and the like. The mono-tertiary-alkyl toluenes and the mono-tertiary-alkyl xylenes form a preferred group of aromatic hydrocarbons within this more general class of hydrocarbons.

In the presence of the suitable oxidation catalysts these alkyl-substituted aromatic hydrocarbons are converted to aromatic acids corresponding to the aromatic hydrocarbons having a carboxyl group in the alkyl side chain. Such aromatic acids are exemplified by the tertiary-alkyl-substituted benzoic acids such as tertiary-butyl benzoic acid, tertiary-amyl benzoic acids, cumic acid, para-tertiary-nonyl benzoic acid, para-tertiary-dodecyl benzoic acids, methyl-tertiary-dodecyl benzoic acids, para-tertiary-hexyl benzoic acids, tertiary-dodecyl-toluic acids, and the like.

The process of the invention is not limited in its application to the purification of crude aromatic carboxylic acids comprised within the above-defined class emanating from any single specific source or produced under any specific hydrocarbon oxidation conditions. The process is, however, applied with advantage to the treatment of crude oxidation products obtained by selective aromatic hydrocarbon oxidation in accordance with the process described and claimed in U. S. Patent 2,578,654.

Crude aromatic carboxylic acid obtained by the catalytic oxidation of the corresponding aromatic hydrocarbons, such as, for example, tertiary-alkyl-substituted-benzene-carboxylic acid-containing oxidation product obtained by oxidizing hydrocarbons comprising tertiary-alkyl-substituted benzene, generally consists of a highly complex mixture comprising isomeric forms of the tertiary-alkyl-substituted benzene carboxylic acid in admixture with unconverted hydrocarbons as well as varying amounts of oxygenated hydrocarbon by-products comprising, for example, not only aliphatic carboxylic acids, aldehydes and ketones but aromatic dicarboxylic acids such as isomeric phthalic acids as well. In addition, still other impurities comprising entrained oxidation catalyst and derivative products thereof are usually also present. Though properties of individual components of this complex mixture may vary widely, separation of the desired alkyl-substituted benzene carboxylic acid therefrom, free of any substantial amount of impurities, especially color-imparting impurities, by methods disclosed heretofore is nevertheless generally exceedingly difficult, it at all possible.

Crude aromatic carboxylic acids to be subjected to the extraction in accordance with the invention may optionally be subjected to suitable pretreatment. Such suitable pretreatment may comprise one or more such steps as, for example filtering, centrifuging, and washing with solvents such as, for example, water, before being subjected to the extraction in accordance with the invention. Crude oxidation products, obtained by the oxidation of aromatic hydrocarbons having at least two alkyl radicals directly attached to the aromatic nucleus, will often comprise oxygenated hydrocarbons including aromatic dicarboxylic acids which are relatively insoluble in crude aromatic carboxylic acid. At least a substantial part of such relatively insoluble products comprising aromatic dicarboxylic acids is preferably separated by such means as filtration, centrifuging, or the like prior to subjecting the crude carboxylic acid to further purification by solvent extraction in accordance with the invention. Such separation of aromatic dicarboxylic acids from the crude hydrocarbon oxidation products may be carried out at temperature conditions most favorable to accomplishment of the desired separation.

Pretreatment of the crude aromatic carboxylic acid prior to further purification by extraction may comprise contact with a suitable liquid medium such as, for example, water, under conditions capable of removing by solution and/or scrubbing effect, such impurities as entrained catalyst and/or derivative products thereof. Contact of the crude acid with water is preferably carried out at a temperature above about 50° C., for example, from about 80 to about 110° C. Contact of the crude acid with the water may be carried out in any suitable type of apparatus such as, for example, a chamber, a coil, a tower, or the like, wherein efficient contact of the water and crude acid undergoing treatment may be brought about. The resulting mixture is allowed to stratify, preferably while still at the elevated temperature, to effect the separation of an aqueous phase from an organic aromatic carboxylic acid-containing phase. The aqueous phase will generally comprise, in addition to entrained oxidation catalyst and catalyst by-products, certain amounts of water-soluble organic impurities including lower boiling aliphatic acids, alcohols, ketones and the like. The aqueous phase is separated from the organic phase and the organic phase is thereupon subjected to the solvent extraction directed to the recovery of high purity aromatic monocarboxylic acid therefrom.

Solvents for the treatment of the crude organic acids in accordance with the invention consist essentially of solutions of the water-soluble salt of an alkali metal with an organic carboxylic acid which organic carboxylic acid possesses no appreciable solubility in aqueous solvents. Thus the extraction of a desired aromatic carboxylic acid from the crude acid in accordance with the invention is carried out in the liquid phase employing as solvent an aqueous solution of a salt of an aromatic carboxylic acid. Suitable salts, the solutions of which are employed as the solvent in the process of the invention, comprise the alkali metal salts of the aromatic carboxylic acids such as, for example, the alkali metal salts of benzoic acid and of a benzoic acid which is substituted by one or more hydrocarbon radicals in any of the positions of its phenyl nucleus other than the 1-position occupied by the carboxyl group. The aliphatic and cycloaliphatic radicals constitute a preferred group of hydrocarbon substituents, representative radicals of this character being, for example, alkyl radicals, such as, methyl, ethyl, propyl, butyl, pentyl isopropyl, isobutyl, isopentyl, octyl, nonyl, octadecyl; cycloalkyl radicals, such as cyclopentyl, cyclohexyl and methylcyclohexyl; the metal portion of the salt is preferably selected from the alkali metals, including sodium, potassum, lithium, stronthium, etc. Of the alkali metal salts the sodium, potassium and lithium salts are preferred. More specific examples of substituted benzoic acid salts, solutions of which are employed as solvents in the process of the invention, comprise: sodium benzoate, sodium toluate, sodium p-butyl benzoate, sodium 2-methyl-4-isopropylbenzoate, sodium 2,4-dimethyl benzoate, sodium paraisopropyl benzoate, sodium para-cyclohexyl benzoate, and sodium paraphenyl benzoate. Of the solutions of alkali metal salts employed as solvents the sodium salts are preferred.

A particularly preferred group of benzoic acid salts, the solutions of which are employed in the present invention, are the alkali metal salts, particularly the sodium salts, of benzoic acids wherein the phenyl nucleus of the acid is substituted by at least one aliphatic radical containing not less than four carbon atoms, one of which is tertiary carbon atom linked directly to a carbon atom of said nucleus. Examples of such preferred aliphatic radicals are the tertiary butyl, tertiaryamyl, 1,1-dimethylpen-2-yl, dodecyl (derived from propylene tetramer), 1-methyl - 1 - ethylhexyl, 1 - methyl - 1 - ethylhexen-5-yl, 1,1 - dimethylbuten - 2 - yl, 1-methylcyclohexyl radicals, and the like. Further substituents on the aromatic nucleus of the preferred salts, other than the carboxyl group and the tertiary carbon-containing radicals, are selected from the group consisting of hydrogen atoms, and alkyl and cycloalkyl radicals as methyl, ethyl, isobutyl, n-pentyl n-heptyl, cyclopentyl cyclohexyl and the like. Representative compounds included in this preferred class of salts, solutions of which are employed as solvents in the process of the invention, are: sodium ortho-tertiary butyl benzoate, sodium meta-tertiary butyl benzoate, sodium para-tertiary butyl benzoate, sodium para-1,1-dimethylbuten-3-yl benzoate, sodium ortho-tertiary-amyl benzoate, sodium meta-tertiary, amyl benzoate, sodium para-tertiary-amyl benzoate, sodium ortho-dodecyl-benzoate, sodium 2-methyl-4-tertiary-butyl benzoate, and sodium 3-methyl-4(1,1-dimethylpropen-2-yl)-benzoate.

In a preferred method of carrying out the process of the invention the crude organic acid is extracted with a solution of the salt of an alkali metal and the organic acid which it is desired to recover from the crude charge. Thus a crude aromatic acid is preferably extracted with a solvent consisting essentially of an aqueous solution of the alkali metal salt, preferably the sodium salt, of the aromatic carboxylic acid which is to be separated in the pure state from the crude acid. Thus, when purifying crude benzoic acid there is preferably employed as solvent a solution of alkali metal benzoic acid; when purifying crude alkyl-substituted benzoic acids, such as, tertiary-butyl benzoic acid, there is preferably employed a solution of alkali metal salt of the alkyl-substituted benzoic acid.

The solvents employed in the extraction are obtained by dissolving the alkali metal salts of the aromatic monocarboxylic acids in a suitable aqueous solvent, such as, for example, water. Although water is the preferred solvent for the alkali metal salts, other aqueous solvents may suitably be employed within the scope of the invention. Such other aqueous solvents comprise, for example, mixtures of water with organic solvents such as methanol, ethanol, isopropanol, propanol, sec.-butanol, acetone, dioxane, tetralin, etc.

The saline solvents employed in the extraction preferably contain the alkali metal salt, for example, the sodium salt of an aromatic monocarboxylic acid, in a concentration of at least 20%, and preferably at least 30%, by weight; the rest of the solvent consisting of the aqueous solvent, preferably water. Maximum concentration of the salt in the solvent is limited only by the solubility of the salt in the liquid in which it is dissolved to obtain the solvent for the process.

The extraction is carried out in any suitable type of equipment enabling intimate contact of the saline solvent and the crude carboxylic acid, and the separation of resulting phases. Mixing chambers and phase separators may be employed or the crude carboxylic acid may be passed in countercurrent flow to the saline solvent in a conventional type of extraction column. The extraction is carried out at an elevated temperature. The specific temperature employed will vary to some extent in accordance with the particular solvent employed and the specific crude aromatic acid undergoing treatment. In general, the use of a temperature above about 50° C. and preferably in the range of, for example, from about 80° to about 100° C. are employed. Higher temperatures may, however, be employed within the scope of the invention. Execution of the extraction at about atmospheric pressure is satisfactory, higher pressures may, however, be employed.

Under the above defined conditions there will be formed an extract phase and a raffinate phase. The raffinate phase will generally comprise hydrocarbons, such as, for example, the aromatic hydrocarbons from which the carboxylic acid was derived by oxidation. The raffinate phase may be recycled to the hydrocarbon oxidation zone wherein the crude aromatic carboxylic acid is produced.

The extract phase will comprise the saline solvent and the desired aromatic monocarboxylic acid. The aromatic monocarboxylic acid content of the crude charge is contained in the extract phase substantially as such and not as a reaction product with any components of the solvent employed. The aromatic monocarboxylic acid is separated from the cooled extract phase by relatively simple practical scale mechanical separating means, such as, for example, filtering, centrifuging and the like. Cooling of the extract phase prior to the mechanical separation of the desired aromatic monocarboxylic acid is preferably controlled to avoid lowering the temperature substantially below that at which at least a substantial part of the desired aromatic monocarboxylic acid separates out as a solid. The specific temperature range to which the extract phase is thus cooled prior to the separation of the desired aromatic acid therefrom may vary within the scope of the invention in accordance with the specific crude aromatic acid being separated and solvent employed. When the crude aromatic acid being purified comprises a mixture of two or more acids which it is desired to recover their separate recovery from the extract phase is often possible by progressively cooling the extract phase to lower temperature levels in stages and filtering between stages. Thus, two isomers of an acid for example, meta- and para-tertiary butyl benzoic acid, contained in an extract phase, are separately recovered by controlled stage-wise cooling and filtration. The solid phase separated upon filtering the extract phase consists essentially of the desired aromatic monocarboxylic acid in a very high state of purity, free of any substantial amount of color-imparting impurities. The filtrate remaining after separation of the aromatic monocarboxylic acid from the extract phase will comprise the saline solvent containing substantially all impurities including traces of phenolic compounds, such non-acid by-products of the oxidation as alcohols, ethers, and carbonylic compounds generally, etc., which were present in the charge to the extraction.

The filtrate, which will consist predominantly of the saline solvent is recycled to the extraction to be reused therein as the solvent. A portion of the filtrate thus recycled to the extract is eliminated from the system as bleed to avoid the build up of impurities within the system.

The process of the invention may be executed in batch or continuous operation. A particular advantage of the invention, however, resides in the ability to execute it in continuous operation.

In order to set forth more fully the nature of the invention it will be described in detail in the following description as applied to the production of tertiary-alkyl-substituted benzene carboxylic acid of high purity derived from the oxidation of the corresponding tertiary-alkyl-substituted benzene hydrocarbon.

Referring to the figure in the attached drawing, hydrocarbons comprising tertiary-alkyl-substituted benzene, such as, for example, tertiary-butyl toluene are passed through line 10 into reaction chamber 11. An oxygen-containing stream, such as, for example, air, is introduced into reactor 11 from a suitable outside source through valved line 12. Within reactor 11 the hydrocarbon stream is oxidized in the presence of a suitable oxidation catalyst, such as, for example, cobalt octoate, at a temperature in the range of, for example, from about 125° to 200° C., preferably from about 150 to about 170° C. The reactor 11 is preferably maintained under a sufficiently high pressure to assure the presence of at least a substantial part of the hydrocarbon and hydrocarbon oxidation products in the liquid phase.

Under the above defined conditions tertiary-butyl toluene is oxidized to reaction products comprising tertiary-butyl-benzoic acid. In addition to tertiary-butyl-benzoic acid the reaction mixture will comprise a lesser amount of dicarboxylic acids such as phthalic acids and other oxygenated hydrocarbons. Such other oxygenated hydrocarbons will comprise a complex mixture including lower boiling aliphatic acids, such as, acetic acid; lower boiling alcohols, aldehydes acetate; and higher boiling aromatic hydrocarbons comprising esters and traces of phenolic compounds.

The resulting complex reaction mixture is drawn from reactor 11 through line 15 and passed to suitable separating means, such as, for example, a filter 16. Within filter 16 the reaction mixture is filtered at an elevated temperature, such as, for example, a temperature in the range of from about 130° to about 200° C., preferably about 150° to about 180° C. The solid phase separated in filter 16 is removed from the system as a final product. Means for removing the solid phase from the filter 16 are exemplified in the drawing by line 17. The solid phase thus separated from the system through line 17 will comprise aromatic dicarboxylic acids, such as, for example, phthalic acid consisting essentially of terephthalic acid.

Hydrocarbon oxidation products remaining as the filtrate are passed from filter 16 through line 20 into a phase separator, such as, for example, chamber 21. Prior to entering the phase separator the filtered oxygenated hydrocarbon stream is admixed with hot water introduced into line 20 from an outside source by means of lines 22 and 23. A heater 24 is provided to bring the water thus introduced to the desired temperature. Temperature conditions within the phase separator 21 are controlled to maintain the contents thereof at an elevated temperature, for example, above about 50° C., preferably, in the range of from about 80 to about 110° C. Stratification within 21 will result in the separation of an aqueous phase comprising entrained catalyst and water-soluble oxygenated hydrocarbons and a tertiary-butyl-benzoic acid-containing hydrocarbon phase. The aqueous phase is withdrawn from the phase separator 21 through valved line 22 and eliminated from the system. The tertiary-butyl-benzoic acid containing hydrocarbon phase is passed from chamber 21 into a suitable extraction zone. The extraction zone may comprise, for example, an extraction column 25.

The tertiary-butyl-benzoic acid-containing hydrocarbon phase introduced into the column 25 will comprise in addition to tertiary-butyl-toluene and tertiary-butyl-benzoic acid, a complex mixture of impurities comprising oxygen-containing organic compounds which are relatively insoluble in water but which possess appreciable solubility in the oxidation products under the conditions of treatment. Such impurities include, for example, hydroxy benzoic acid, decarboxylic acids such as isomeric phthalic acids, phenolic bodies such as tert.-butyl phenol, aromatic alcohols, aromatic aldehydes, other impurities having decided deterimental effect upon color and other properties of the product, etc. When the charge to column 25 has been water-washed, any water-soluble impurities will generally be present therein in only minor amounts. However, if the optional water washing step is omitted, the charge to column 25 will also contain substantial amounts of water soluble oxygen-containing impurities originally present in the crude hydrocarbon oxidation products.

Valved lines 18 and 29 are provided for the introduction of crude tert.-butyl benzoic acid into the system from an outside source. Crude tert.-butyl benzoic acid thus introduced into the system may comprise a part or all of the crude organic acid charged to the recovery operation comprising the extraction in column 25.

Within column 25 the tertiary-butyl-benzoic acid-containing hydrocarbon stream is passed upwardly countercurrent to a descending stream of solvent consisting essentially of an aqueous solution of an alkali metal salt of tertiary-butyl-benzoic acid, for example, aqueous sodium tertiary-butyl benzoate. The solvent is introduced into the upper part of the column 25 by means of line 26. Temperature conditions are controlled to maintain the contents of column 25 at a temperature above about 50° C,. preferably from 80° C. to about 100° C. The extraction is carried out at substantially atmospheric pressure, though higher pressures may be employed within the scope of the invention. The solvent, consisting essentially of aqueous sodium tertiary-butyl benzoate, introduced into the column contains at least 20%, and preferably at least 30%, by weight of sodium tertiary-butyl benzoate, the rest of the solvent consisting essentially of water.

Temperature conditions within column 25 are controlled by suitable means, such as, for example, by heat exchangers 27 and 28 in lines 26 and 23, respectively, and optionally by other means not shown in the drawing.

Under the above-defined conditions there will be formed a raffinate phase comprising tertiary-butyl toluene and an extract phase comprising aqueous sodium tertiary-butyl benzoate and tertiary-butyl-benzoic acid.

The raffinate phase comprising tertiary-butyl toluene is eliminated from column 25 through valved line 30. At least a part of the raffinate stream thus passed through valved line 30 may be recycled in part or in its entirety through valved line 31 into line 10 discharging into the reactor 11. A part or all of the raffinate phase thus recycled through line 31 may be subjected to a hot water wash to effect the removal of water-soluble non-hydrocarbon materials, comprising any entrained aqueous sodium tertiary-butyl benzoate, therefrom. To this effect a valved line 32 is provided to enable the by-passing of at least a part of the hydrocarbon recycle stream from line 31 into phase separator 33. Prior to entering phase separator 33 the hydrocarbon stream flowing through line 32 is admixed with hot water introduced into line 32 by means of valved line 22. Aqueous phase comprising water soluble impurities removed from the recycled hydrocarbon stream is removed from phase separator 33 by means of valved line 34. Hydrocarbon phase consisting essentially of tertiary-butyl toluene is passed from phase separator 33 through valved line 35 into line 31.

The extract phase is passed from extraction column 25, through line 37, into suitable cooling means, such as, for example, a chamber 38. It is to be noted that the tertiary-butyl-benzoic acid separated from the oxygenated hydrocarbon stream charged to column 25 is present in the extract phase withdrawn through line 37 as such and not as a reaction product; the aqueous sodium tertiary-butyl-benzoate functioning as a solvent and not as a reagent within column 25. The extract phase will comprise, in addition to aqueous sodium tertiary-butyl-benzoate and tertiary-butyl-benzoic acid, the complex mixture of impurities comprising the oxygenated hydrocarbons including dicarboxylic acids, alcohols, esters, phenolics, color-imparting impurities, etc., present in the charge to column 25. Within chamber 38 the extract phase is cooled to a temperature sufficiently low to effect the substantially selective separation of the tertiary-butyl-benzoic acid as a solid phase. A temperature of, for example, in the range of from about 20° to about 35° C. has been found suitable. Suitable means, such as, for example, a closed cooling coil 39, and optionally other means not shown in the drawing, are provided to obtain the desired temperature control within chamber 38. From chamber 38 the cooled extract phase is passed as a slurry through line 41 to suitable separating means such as, for example, a filter 40.

The solid phase consisting essentially of tertiary-butyl-benzoic acid is separated from the extract phase in filter 40 by filtration and removed therefrom by conventional means exemplified in the drawing by a valved line 42. The solid phase separated in filter 40 may be washed with one or more suitable solvents, such as, for example, water, hydrocarbons, such as benzene, toluene, tertiary-butyl toluene, hexane and the like.

The tertiary-butyl-benzoic acid thus separated as a solid phase in filter 40 and eliminated from the system as a final product is found to consist of tertiary-butyl-benzoic acid of unusually high purity, free from any substantial amount of impurities including color imparting impurities. Filtrate, consisting essentially of aqueous sodium tertiary-butyl benzoate and the impurities contained in the charge to column 25, is passed from filter 40 through valved line 43 into line 26 to function again as the solvent in the extraction column 25. To avoid any build up of impurities within the system a relatively small portion of the filtrate recycled through line 45 is bled from the system by means of valved line 44. Although the bleed from the system of only a relatively small amount of material through line 44 suffices to avoid impurity-accumulation, additional means not shown in the drawing may be employed to purify, to at least a substantial degree, the recycled solvent. Make-up saline solvent for the extraction step in column 25 is produced by passing a sufficient amount of the tertiary-butyl-benzoic acid product into a solvent make-up drum, 45, by conventional means, exemplified in the drawing by valved line 46. Within drum 45 the tertiary-butyl-benzoic acid is reacted with aqueous sodium hydroxide, introduced by means of line 47, to result in the formation of the aqueous sodium tertiary-butyl-benzoate. The resulting make-up aqueous sodium tertiary-butyl-benzoate is passed from make-up drum 45 through valved line 49 into line 26 discharging into the extraction column 25. The solid phase consisting essentially of tertiary-butyl-benzoic acid separated as a final product in filter 40 is preferably washed with fresh saline solvent in order to remove any residual impurities and then with water to remove residual saline solvent. To this effect a valved line 50 is provided enabling the passage of aqueous sodium tertiary-butyl-benzoate from chamber 45 through lines 49 and 50 into filter 40 to wash the separated solid phase. The saline solvent thus introduced into the filter 40 by means of line 50 after functioning as a wash for the solid phase in filter 40 is returned through valved line 48 to solvent make-up chamber 45. If desired, all or a part of the saline solvent which has functioned as a wash for the product may be passed through lines 43 and 26 to the extraction column 25. A valved line 50 is provided for the introduction of water into filter 40 to wash residual saline solvent from the product. Wash water is passed from filter 40 through valved line 48 and introduced into solvent make-up drum 45 or eliminated in part or entirely from the system through valved line 51.

Although but one extract phase cooler and filter are shown in the figure of the drawing more than one such cooler and filter may be employed thereby enabling uninterrupted continuous operation as well as the separate recovery by fractional crystallization of several separate aromatic carboxylic acids from the extract phase.

Separation of aromatic monocarboxylic acids from crude hydrocarbon oxidation products comprising them by the method of the invention is further illustrated by the following:

*Example*

| | Percent by weight |
|---|---|
| Tertiary-butyl-benzoic acid | 50 |
| Tertiary-butyl-toluene | 45 |
| Dicarboxylic acids | 0.2 |
| High boiling non-acid oxygen-containing compounds (esters, aldehydes, etc.) | 4.5 |
| Lower boiling products (organic acids, alcohols, etc.) | 0.3 |

The tertiary-butyl-benzoic acid content contained approximately 95% by weight of para-tertiary butyl benzoic acid, the remainder consisted of meta-tertiary butyl benzoic acid.

The crude oxidation product was filtered at a temperature of 150° C. The solid phase obtained was found to consist predominantly of dibasic acids, comprising terephthalic acid. The filtrate was washed with hot water at a temperature of 80° C. The washed filtrate was thereupon subjected to liquid-liquid extraction with an aqueous solution of sodium tertiary butyl benzoate, containing 20% by weight of sodium tertiary-butyl benzoate, at a temperature of 95° C. The solvent extraction was carried out employing a weight ratio of saline solvent to washed filtrate of 3:1. The resulting raffinate phase consisted essentially of tertiary-butyl toluene. The extract phase was cooled to a temperature of 25° C. and subjected to filtration. The solid phase separated during the filtration was found to consist of tertiary-butyl-benzoic acid of greater than 99% purity consisting essentially of only the para-tertiary butyl benzoic acid. The high degree of purity of the product was evidenced by a maximum ash value of about 0.02% by weight and a cobalt content not exceeding 0.5 part per million. A further indication of the purity of the tertiary butyl benzoic acid thus obtained, particularly with respect to the substantially complete absence therein of color imparting impurities, is evidenced by the low degree of color observed after heating the acid at a temperature of about 250° C., that is well above its melting point. Maintaining a portion of the para-tertiary butyl benzoic acid product thus obtained at 250° C. for approximately four hours resulted in only a relatively slight coloration. The initial color of the acid melt at the beginning of the heating period at 250° C. was approximately 2 and at the end of the four hour heating period about 9. Color ratings herein employed refer to the Gardner color scale. A sample of crude tertiary butyl benzoic acid obtained by crystallization of a portion of the crude charge to the extraction was found to have an initial color at the melting point of greater than 18.

The invention claimed is:

1. The process for recovering a tertiary-alkyl substituted benzene carboxylic acid in a high state of purity from the crude oxidation products obtained by oxidizing the corresponding tertiary-alkyl substituted alkyl benzene, which crude oxidation products comprise said tertiary-alkyl substituted benzene carboxylic acid in admixture with unconverted aromatic hydrocarbons and oxygen-containing organic by-products of said oxidation, which comprises subjecting said crude oxidation products to liquid-liquid extraction at a temperature above about 50° C. with a solvent consisting essentially of an aqueous solution of the salt of an alkali metal with the tertiary-alkyl benzene carboxylic acid being recovered from said crude oxidation products, said solution containing at least 20% by weight of said salt, thereby forming an extract phase comprising said solvent and said tertiary-alkyl substituted benzene carboxylic acid and a raffinate phase comprising said unconverted aromatic hydrocarbons and said oxygen-containing organic by-products, and recovering said tertiary-alkyl substituted benzene carboxylic acid from said extract phase.

2. The process for recovering tertiary-alkyl benzoic acid in a high state of purity from crude oxidation products obtained by oxidizing the corresponding tertiary-alkyl toluene which crude oxidation products comprise said tertiary-alkyl benzoic acid in admixture with unconverted aromatic hydrocarbons and oxygen-containing organic by-products of said oxidation, which comprises subjecting said crude oxidation products to liquid-liquid extraction at a temperature above about 50° C. with a solvent consisting essentially of an aqueous solution of the salt of an alkali metal with the tertiary-alkyl benzoic acid being recovered from said crude oxidation products, said solution containing at least 20% by weight of said salt, thereby forming an extract phase comprising said solvent and said tertiary-alkyl benzoic acid and a raffinate phase comprising said unconverted aromatic hydrocarbons and said oxygen-containing organic by-products, and recovering said tertiary-alkyl benzoic acid from said extract phase.

3. The process in accordance with claim 2 wherein said salt is the sodium salt of said tertiary alkyl benzoic acid.

4. The process in accordance with claim 3 wherein said tertiary-alkyl benzoic acid is para-tertiary-alkyl benzoic acid and said salt is the sodium salt of said para-tertiary-alkyl benzoic acid.

5. The process for recovering tertiary-butyl benzoic acid in a high state of purity from crude oxidation products obtained by oxidizing tertiary-butyl toluene, which oxidation products comprise said tertiary-butyl benzoic acid in admixture with unconverted tertiary butyl toluene and oxygen-containing organic by-products of said oxidation, which comprises subjecting said crude oxidation products to liquid-liquid extraction at a temperature above about 50° C. with a solvent consisting essentially of an aqueous solution of the salt of an alkali metal with tertiary-butyl benzoic acid, said solution containing at least 20% by weight of said salt, thereby forming an extract phase comprising said solvent and said tertiary-butyl benzoic acid and a raffinate phase comprising said unconverted tertiary-butyl toluene and said oxygen-containing organic by-products, and recovering tertiary-butyl benzoic acid from said extract phase.

6. The process in accordance with claim 5 wherein said salt is the sodium salt of tertiary-butyl benzoic acid.

7. The process for recovering para-tertiary-butyl benzoic acid in a high state of purity from crude oxidation products obtained by oxidizing para-tertiary-butyl toluene, which crude oxidation products comprise said para-tertiary-butyl benzoic acid in admixture with unconverted para-tertiary-butyl toluene and oxygen-containing organic by-products of said oxidation, which comprises subjecting said crude oxidation products to liquid-liquid extraction at a temperature of from about 80° to about 100° C. with a solvent consisting essentially of an aqueous solution of the sodium salt of para-tertiary-butyl benzoic acid, said solution containing at least 30% by weight of said salt, thereby forming an extract phase comprising said solvent and said para-tertiary-butyl benzoic acid and a raffinate phase comprising said unconverted para-tertiary-butyl toluene and said oxygen-containing organic by-products, and recovering para-tertiary-butyl benzoic acid from said extract phase.

8. The process in accordance with claim 7 wherein said para-tertiary-butyl-benzoic acid is separated from said extract phase by the successive steps of cooling and filtering said extract phase.

References Cited in the file of this patent

UNITED STATES PATENTS

| | | |
|---|---|---|
| 2,317,455 | Gubelmann et al. | Apr. 27, 1943 |
| 2,578,654 | Hearne et al. | Dec. 18, 1951 |

OTHER REFERENCES

Weisberger: Technique of Organic Chemistry, vol. III, 1950, pp. 298–299.